Sept. 4, 1923.

A. P. MORTENSEN

BEET TOPPER

Filed Jan. 26, 1921

ARLINGTON P. MORTENSEN
INVENTOR.

BY Watson E. Coleman
ATTORNEY.

Sept. 4, 1923.

A. P. MORTENSEN

BEET TOPPER

Filed Jan. 26, 1921

Arlington P Mortensen. INVENTOR.

BY Watson E. Coleman ATTORNEY.

Sept. 4, 1923.

A. P. MORTENSEN

BEET TOPPER

Filed Jan. 26, 1921

Arlington P. Mortensen, INVENTOR.

BY Watson E. Coleman, ATTORNEY.

Patented Sept. 4, 1923.

1,466,889

UNITED STATES PATENT OFFICE.

ARLINGTON P. MORTENSEN, OF PROVO, UTAH, ASSIGNOR OF ONE-TENTH TO T. H. DUDLEY, OF SANTA MONICA, CALIFORNIA.

BEET TOPPER.

Application filed January 26, 1921. Serial No. 440,130.

*To all whom it may concern:*

Be it known that I, ARLINGTON P. MORTENSEN, a citizen of the United States, residing at Provo, in the county of Utah and State of Utah, have invented certain new and useful Improvements in Beet Toppers, of which the following is a specification, reference being had to the accompanying drawings.

This invention relates to improvements in beet topping devices.

An important object of the invention is to provide a device of this character having means for delivering the beets adjacent a cutter knife where they may be fed to the cutter knife by an attendant.

A further object of the invention is to so feed the beets that the tops thereof lie toward the cutter knife in order to facilitate the handling of the beets by the attendant.

Other objects and advantages of the invention will become apparent throughout the course of the following description.

In the accompanying drawings, wherein for the purpose of illustration is shown a preferred embodiment of my invention, and wherein like reference characters designate like parts throughout:

Figure 6 is a section on the line 6—6 of Figure 2, and

Figure 7 is a detail view showing the mounting of the beater shaft.

Figure 1:
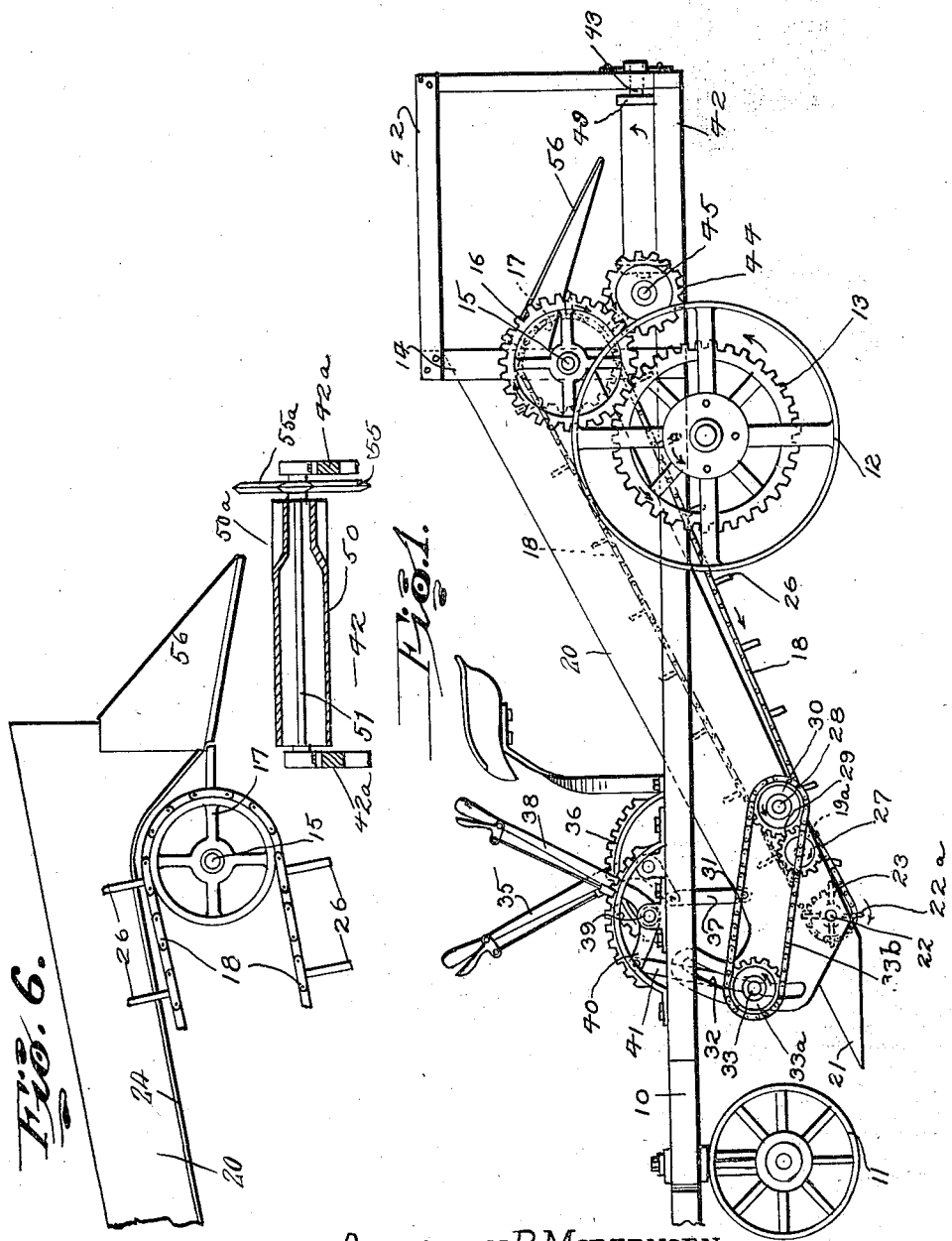
Figure 1 is a side elevation of a beet harvester constructed in accordance with my invention.
Figure 2:
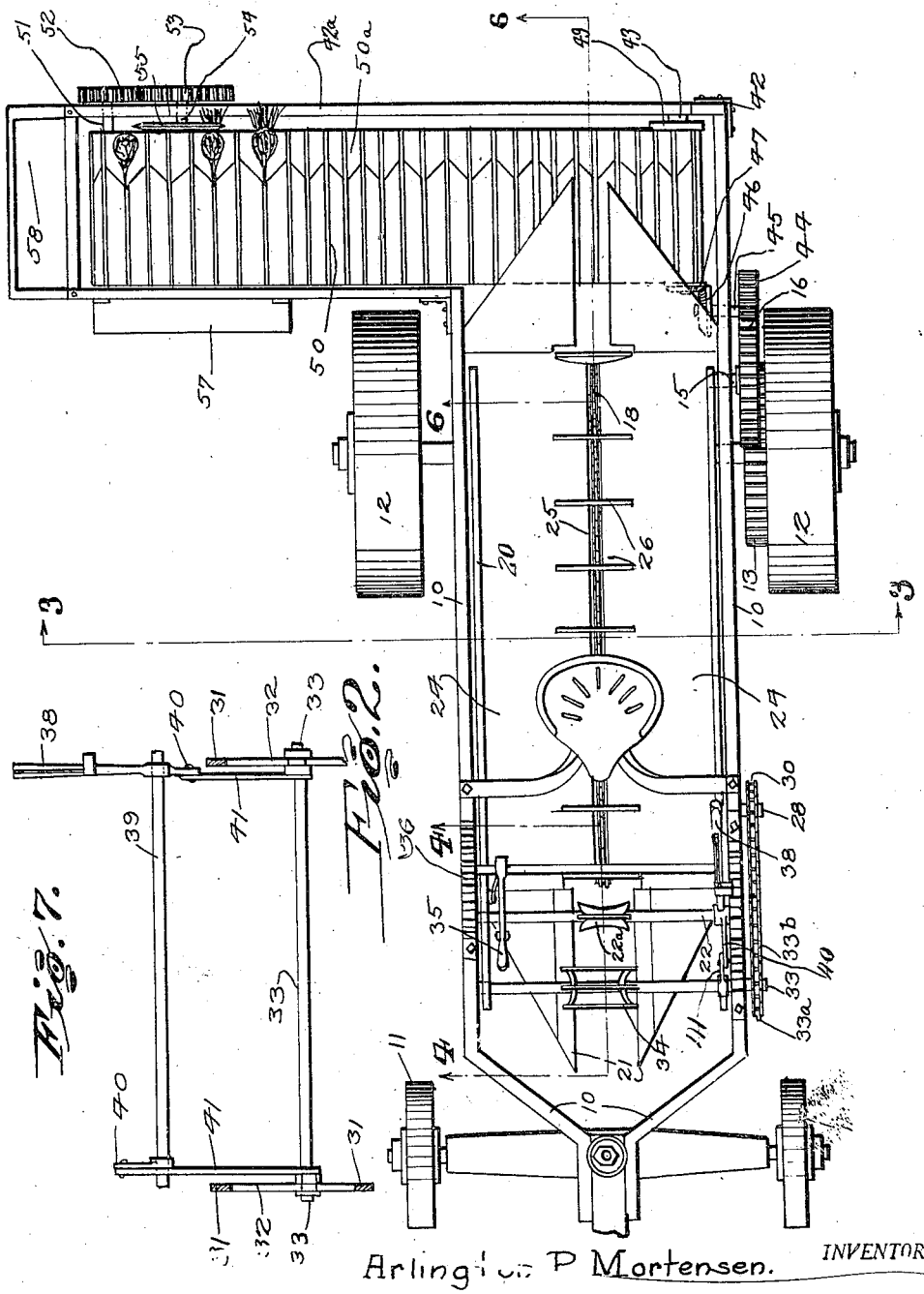
Figure 2 is a plan view thereof.
Figure 3:
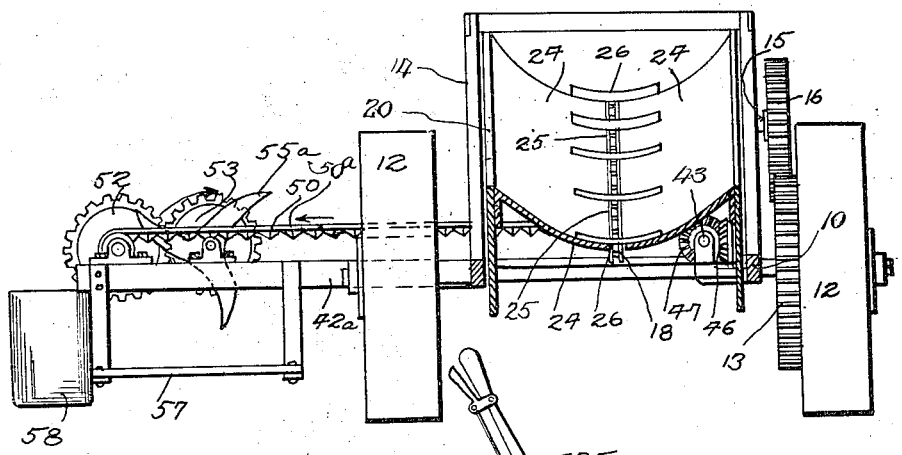
Figure 3 is a section on the line 3—3 of Figure 2.
Figure 4:
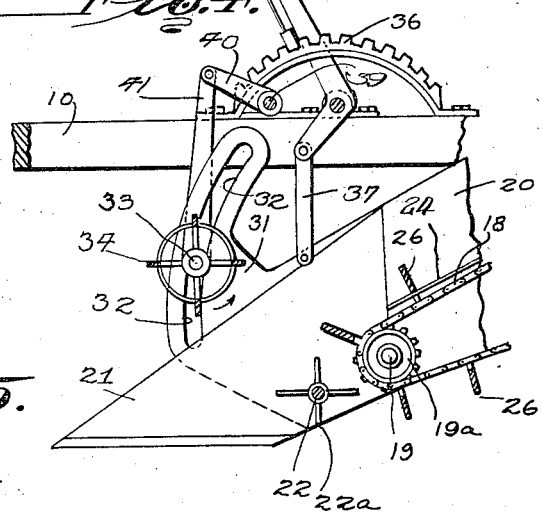
Figure 4 is a section on the line 4—4 of Figure 2.
Figure 5:
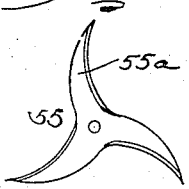
Figure 5 is a detail side elevation of the topper knife.

Referring now more particularly to the drawings, the numeral 10 indicates a body frame supported forwardly by steering and supporting wheels 11 and rearwardly by driving wheels 12. One of the driving wheels 12 is provided with a gear 13 which is secured thereto.

Extending upwardly from the main frame is a pair of vertical standards 14 in which is rotatably mounted a shaft 15 provided at one end with a gear 16 meshing with the gear 13 of the drive wheel to be driven thereby. The shaft 15 is provided at its approximate longitudinal center with the sprocket wheel 17 forming a drive for a conveyor chain 18, the forward end of which is supported by a sprocket wheel 19$^a$ carried by the shaft 19.

The numeral 20 indicates side boards which form supports for the shaft 19 and which are pivotally mounted upon the shaft 15 at their rear ends. These side boards have secured thereto at the forward ends thereof beet lifters or shares 21 which extend forwardly in spaced relation. The forward end of the side boards 20 likewise forms a rotatable support for the shaft 22 which is provided with arms 22$^a$ adapted to extend intermediate the shares 21 to receive the beets as they pass upwardly thereon and deposit the same upon the conveyor. Secured to the side boards are downwardly inclined sides 24 having the space 25 between their inner or adjacent ends, in which space the conveyor chain 18 operates. The chain is provided with sweeps or cross members 26 which operate upon the surface of the inclined sides 24 adjacent the inner ends thereof.

The shaft 19 has one end extending through one of the side boards 20 and provided with a gear 27. Adjacent this gear 27 a stub shaft 28 is mounted in the corresponding side board and forms a support for a compound member embodying a gear 29 meshing with the gear 27 to be driven thereby and a sprocket wheel 30. The side boards 20 embody an upward extension 31 having formed therein arcuate grooves 32 having the axial center of the stub shaft 28 as a center. These grooves form a guide way for a vertically adjustable shaft 33 which is provided upon one end thereof with a sprocket gear 33$^a$ connected with the sprocket gear 30 by means of a chain 33$^b$. The shaft 33 has extending outwardly therefrom beater arms 34 for a purpose presently to appear.

Mounted upon the main frame 10 is a lever 35 coacting with the segment 36 and connected with side boards 20 to provide means whereby the shares 21 and the lower end of the conveyor may be vertically adjusted as desired. A second segment lever 38 is provided secured to the shaft 39 extending transversely of the frame 10 to rock the same. This shaft is provided with arms 40 which connect with the shaft 33 by means of hanger links 41. It will be obvious that by adjusting the lever 38, the position of the shaft 33 and beaters 34 thereof with relation to the shares 21 may be variably altered. It will likewise be obvious that the forward end of the conveyor and the shaft 33 are independently vertically adjustable since if the forward end of the conveyor be elevated and the position of the shaft 33 be not altered, the shares 21 approach or move away from the shaft 33, depending upon the direction of adjustment.

The frame 10 is provided at its rear end with a transversely extending section 42 embodying a portion which extends to one side of the frame as indicated at 42$^a$. In that portion of the extension 42 lying rearwardly of the main frame 10 a shaft 43 extending longitudinally of the main frame 10 is rotatably mounted. A gear 44 meshes with the gear 16 of the shaft 15 to drive the short shaft 45 which is provided with a beveled gear 46 meshing with a similar beveled gear 47 of the shaft 43. The shaft 43 is provided with a roller 49 and forms a drive for a conveyor belt 50, the opposite end of which is rotatably supported by a roller carried by the shaft 51 which shaft is disposed at the extremity of the portion 42$^a$ of the main frame. The outer end of the shaft 51 is provided with a gear 52 meshing with a gear 53 carried by the shaft 54 upon which shaft is mounted the topper knife 55 embodying substantially radial cutting blades 55$^a$. In order to insure proper alignment of the beets while on the conveyor, the flights thereof are provided with transversely extending V-shaped depressions 50$^a$ which receive the beets as they drop from the chute 56.

In the operation of my device, the beets are lifted from the ground by the shares 21 and the tops thereof are engaged by the arms 34 of the shaft 33, throwing the tops of the beets rearwardly. The arms 22$^a$ of the shaft 22 engage the bodies of the beets as they pass from the rear ends of the shares 21 and assist in placing the same upon the conveyor chain 18 where they are carried upwardly and deposited upon the downwardly inclined chute member 56. From this chute member 56 the beets slide into the depressions 50$^a$ of the conveyor 50 with the tops thereof directed rearwardly and are carried toward the cutting knife. A foot board 57 is provided to form a stand for the operator who may engage the beet with his hand as it approaches the knife, the body of the beet being directed toward the attendant and greatly facilitating such grasping. After the beets have been topped by the knife 55, they may be allowed to again fall upon the conveyor and be carried to a receptacle 58 which receptacle may be dumped when a sufficient quantity have been collected. This receptacle may have any desired form as for example, a wagon or other suitable wheeled device which may be separated and conveyed to a desired dumping point.

From the foregoing it will be obvious that I have constructed a beet harvester and topper which, by reason of its simplicity and efficiency in operation, is particularly well adapted for the use for which it is intended; and it will likewise be obvious that the construction of the same as hereinbefore set forth is capable of some change without departing from the spirit of my invention. I, accordingly, do not limit myself to the specific structure as hereinbefore set forth, except as so limited by the sub-joined claims.

What I claim is:

1. In a beet harvester and topper, a frame, a conveyor supported by the frame, a topper knife operating adjacent one edge of said conveyor, means carried by the frame for delivering the tops to said conveyor with the tops thereof toward said topper knife, including a second conveyor having its upper end provided with a discharge trough discharging to the first named conveyor, the lower end of the second named conveyor being arranged in spaced relation to the ground, means in advance of and above the lower end of the second named conveyor for engaging the tops of beets to direct the same toward the second named conveyor, means for driving said conveyors, a driving connection between the second conveyor and the beet top engaging means, means for simultaneously vertically adjusting the lower end of said second conveyor and said beet top engaging means, and means for independently vertically adjusting the beet top engaging means.

2. In a beet harvester and topper, a frame, a conveyor supported by the frame, a topper knife operating adjacent one edge of said conveyor, means carried by the frame for delivering the tops to said conveyor with the tops thereof toward said topper knife, including a second conveyor having its upper end provided with a discharge trough discharging to the first named conveyor; the lower end of the second named conveyor being arranged in spaced relation to the ground, means in advance of and above the lower end of the second named conveyor for engaging the tops of the beets to direct the same toward the second named conveyor, means for driving said conveyors, a driving connection between the second conveyor and the beet top engaging means, means for simultaneously vertically adjusting the lower end of said second conveyor and said beet top engaging means, means for independently vertically adjusting the beet top engaging means, and means intermediate the beet top engaging means and the lower end of said second conveyor for elevating the beets to said second conveyor.

In testimony whereof I hereunto affix my signature.

ARLINGTON P. MORTENSEN.